(No Model.)

C. WARD.
SAW SWAGE.

No. 352,670.　　　　　　　　　Patented Nov. 16, 1886.

WITNESSES:
O. D. Mott
C. Sedgwick

INVENTOR:
C. Ward
BY Munn & Co
ATTORNEYS.

N. PETERS. Photo-Lithographer, Washington, D. C.

UNITED STATES PATENT OFFICE.

CLARENCE WARD, OF HARING, MICHIGAN.

SAW-SWAGE.

SPECIFICATION forming part of Letters Patent No. 352,670, dated November 16, 1886.

Application filed August 25, 1886. Serial No. 211,826. (No model.)

*To all whom it may concern:*

Be it known that I, CLARENCE WARD, of Haring, in the county of Wexford and State of Michigan, have invented a new and Improved Saw-Swage, of which the following is a full, clear, and exact description.

My invention relates to saw-swages, and has for its object to produce a swage of simple construction, which, when clamped to a filing-bench or other support and adjusted to the saw, need not be readjusted until a saw of greater diameter is to be operated upon, and wherein the teeth can be easily and perfectly swaged in rapid succession, and wherein, further, the swaging mechanism is capable of adjustment to work on either side of a tooth.

The invention consists in the construction and operation of the several parts, as will be hereinafter fully set forth, and pointed out in the claims.

Reference is to be had to the accompanying drawings, forming a part of this specification, in which similar letters of reference indicate corresponding parts in all the figures.

Figure 1:
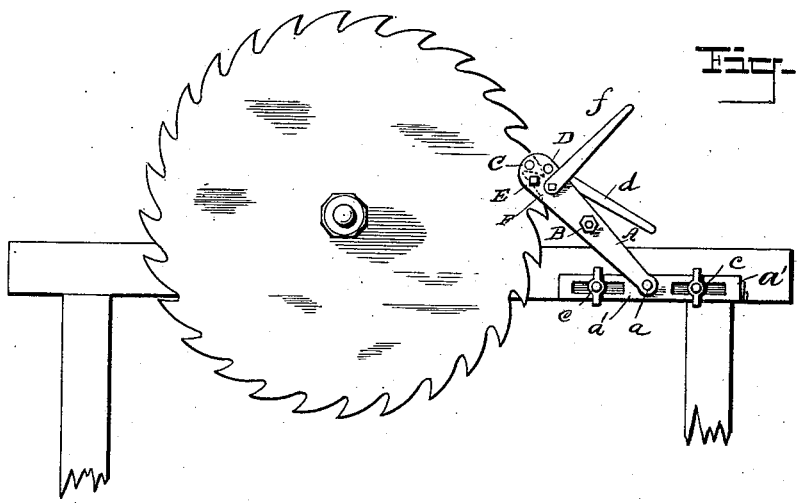
Figure 2:
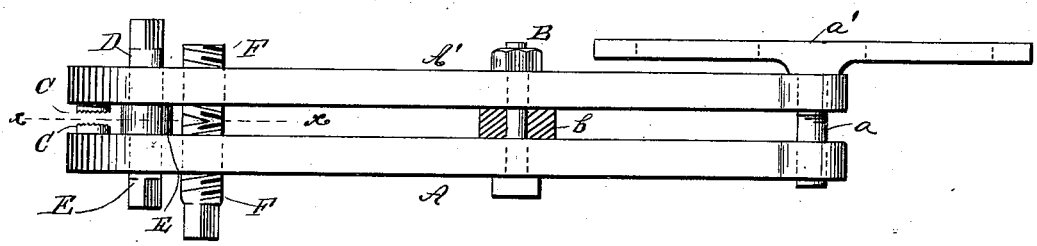
Figure 3:
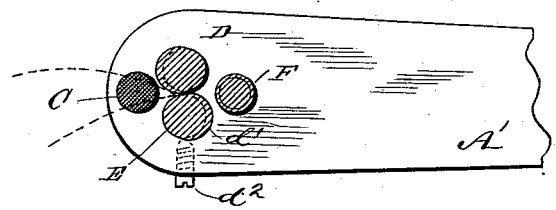
Figure 4:
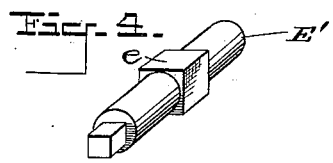

Figure 1 is a side elevation of my swage in position to work; Fig. 2, a plan view thereof; Fig. 3, a partial longitudinal section thereof on the line $x\ x$ in Fig. 1, and Fig. 4 is a perspective view of one form of anvil.

The frame of my swage consists of two parallel tapering plates, A A', preferably made of mild steel, held a proper distance apart by means of a bolt, B, passing centrally through them, carrying a gage-washer, $b$, adapted to intervene the said plates A A'. The said gage-washer $b$ is usually made of a thickness to so space the plates as to enable them to receive the teeth of the largest saw ordinarily used.

The lower or contracted ends of the plates A A' are pivoted upon a pin, $a$, attached to or made integral with a slotted plate, $a'$, purposed to be fastened to a filing-bench, as shown in Fig. 1, or other convenient place, by means of screw-clamps $c$, or other equivalent device, whereby the swage may be adjusted to different-sized saws by sliding the said slotted plate $a'$ toward or away from the arbor upon which the saw is hung.

Upon the inner faces of the plates A and A', centrally near the edge of the enlarged ends thereof, serrated jaws C are provided, preferably circular in form, to engage each side of a saw-tooth and hold it firmly when the said tooth has been entered for swaging. These jaws are usually made of tool-steel, and are attached to the plates A A' in any approved manner.

An eccentric-faced roller, D, is journaled transversely in the sides of the plates A A', at a point slightly above the center of their enlarged ends, and revolved in said bearings by means of a handle, $d$, attached to the end of said roller D, extending through the right-hand plate A'. The said eccentric-faced roller D is adapted to engage and operate in conjunction with an anvil, E, circular in form and provided with an eccentric face, $d'$, intersecting its circular bearing-face. The said anvil E is positioned immediately under the eccentric-faced roller D, and held stationary within the plates A A' by set-screws $d^2$, entered through the lower edge of the said plates, as shown in Fig. 3. The object of having an eccentric surface upon the anvil E is to enable the operator to take up any possible wear which may become apparent on the eccentric roller D from continual use. Both the anvil E and the eccentric-faced roller D are usually made of tool-steel tempered upon the side sustaining pressure.

When the form of anvil above stated is used, the teeth will be swaged with a more or less concaved surface. When, however, it is desirable to keep a square front on the teeth, I employ a form of anvil, E', (shown in Fig. 4,) provided with central square raised sides $e$, the said sides $e$ being elevated for the same purpose that the eccentric face is employed upon the round anvil E.

A screw, F, having a right-hand thread cut on one end and a left-hand thread upon the other, is entered to extend through correspondingly-threaded apertures in the plates A A' and be operated by means of a handle, $f$, attached to the end of the said screw projecting through the left-hand plate A. The object of this screw F is to draw the plates A A' toward each other, so that the serrated jaws C will take a firm hold on teeth of varied thickness. The said screw is preferably made of mild steel. When this swage is once adjusted properly to accommodate the size of saw to be swaged, it will remain stationary until every tooth in the saw is operated upon, except the slight movement caused by raising and lowering the end containing the swaging-roller and anvil to adjust the same to or release a tooth. The eccentric-faced roller D and the anvils E and E' are interchangeable, and can readily be adjusted to work upon either side of a tooth, and can be made of all sizes to work successfully upon any ripping-saw, from band-saws to circular saws; also upon edgers and shingle and small saws.

In using the swage the operator stands facing the saw, with the swage fastened so that the handle $d$ of the eccentric-faced roller D will be to his right hand and the handle $f$ of the screw F to his left hand, as shown in Fig. 1. The frame is then adjusted to the tooth, which enters between the serrated jaws to a bearing between the roller D and anvil E. The operator with the left hand turns the handle $f$, thereby clamping the saw firmly by means of the said serrated jaws. Then by giving the handle $d$ a third or half turn the point of the tooth is swaged, when the handle is carried back to the first position, the point of the tooth is released, the jaws are then released, and the frame slightly raised to discharge the said tooth, and lowered again to receive another.

Having thus described my invention, what I claim as new, and desire to secure by Letters Patent, is—

1. A saw-swage consisting of the parallel plates A A', separated centrally by a gage-washer, $b$, pivotally connected at one end to an adjustable plate, $a'$, and provided at the other with serrated jaws C, eccentric-faced roller D, and interchangeable stationary anvils E, together with a clamping-screw, F, and means for operating said roller D and screw F, substantially as shown and described, and for the purpose herein set forth.

2. In a saw-swage, the combination, with a frame constructed as herein set forth, of the serrated jaws C, eccentric-faced roller D, and interchangeable anvil E, held stationary within said frame by set-screws $d^2$, together with a clamping-screw, F, and means for operating said roller and screw, substantially as shown and described, and for the purpose herein set forth.

3. In a saw-swage, the combination, with a frame constructed as herein set forth, of the serrated jaws C, eccentric-faced roller D, and the stationary anvil E, provided with a circular bearing-surface and an inner eccentric surface, $d'$, together with a right and left threaded screw, F, and means for operating said roller D and screw F, substantially as shown and described, and for the purpose herein set forth.

4. In a saw-swage, the combination, with the parallel-spaced plates A A', carrying clamping jaws, and means for swaging a tooth, of the oppositely-threaded screw F, substantially as shown and described, and for the purpose herein set forth.

5. The combination, with two spaced bars provided at one end with holding-jaws, and means for clamping the said jaws to a saw-tooth, of an anvil adjustably held in said bars, and an eccentric roller journaled in said bars above the anvil, substantially as shown and described.

CLARENCE WARD.

Witnesses:
JAMES CHATFIELD,
GEORGE CRAWFORD.